United States Patent
Chow et al.

(10) Patent No.: US 6,438,134 B1
(45) Date of Patent: Aug. 20, 2002

(54) TWO-COMPONENT BANDWIDTH SCHEDULER HAVING APPLICATION IN MULTI-CLASS DIGITAL COMMUNICATIONS SYSTEMS

(75) Inventors: Henry Chow, Kanata; Anthony Hung, Ottawa; Mark Janoska, Carleton Place; Srinivasan Ramaswamy, Ottawa, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/140,059

(22) Filed: Aug. 24, 1998

(30) Foreign Application Priority Data

Aug. 19, 1998 (CA) .............................................. 2245367

(51) Int. Cl.$^7$ .............................................. H04L 12/28
(52) U.S. Cl. .................... 370/412; 370/230; 370/395.43
(58) Field of Search ................................ 370/230, 231, 370/232, 233, 234, 235, 413, 412, 415, 416, 417, 418, 428, 429, 477, 537, 395.4, 395.41, 395.42, 395.43

(56) References Cited

U.S. PATENT DOCUMENTS

| | | | | |
|---|---|---|---|---|
| 5,850,399 A | * | 12/1998 | Ganmukhi et al. | 370/412 |
| 5,905,730 A | * | 5/1999 | Yang et al. | 370/429 |
| 5,959,993 A | * | 9/1999 | Varma et al. | 370/416 |
| 6,018,527 A | * | 1/2000 | Yin et al. | 370/412 |
| 6,047,000 A | * | 4/2000 | Tsang et al. | 370/412 |
| 6,134,217 A | * | 10/2000 | Stiliadis et al. | 370/417 |
| 6,272,109 B1 | * | 8/2001 | Pei et al. | 370/230 |

OTHER PUBLICATIONS

Hogan, Hierarchical Fair Queuing, University of Sydney, pp. 1–23, Apr. 28, 1996.*

Deng et al., Scheduling Real–Time Applications in an Open Environment, University of Illinois, pp. 1–25, May 14, 1997.*

(List continued on next page.)

*Primary Examiner*—Wellington Chin
*Assistant Examiner*—Frank Duong
(74) *Attorney, Agent, or Firm*—Blake, Cassels & Graydon LLP

(57) ABSTRACT

The method for servicing queues holding messages, such as ATM data packets, for subsequent processing or transmission to a resource such as a communications link having a finite processing capability comprises the steps of servicing each queue by forwarding the messages thereof to the resource at time intervals corresponding to a guaranteed service rate of the queue, provided the queue is non-empty; and, during time intervals when none of the queues have messages being forwarded to the resource in conformance with the above step, servicing the queues in accordance with a proportion of a remaining or idle resource bandwidth allocated to each queue. The method is preferably carried out by a hierarchical scheduler comprising an exhaustive sub-scheduler servicing a plurality of lower level sub-schedulers in accordance with non-equal priority levels assigned thereto; M non-work conserving shaper sub-schedulers feeding the exhaustive sub-scheduler; and N work conserving idle bandwidth sub-schedulers feeding the exhaustive sub-scheduler. In such a scheduler, a queue concurrently contends for service by one of the shaper sub-schedulers and one of the idle bandwidth sub-schedulers, wherein the shaper sub-scheduler servicing the queue has a higher priority level with respect to the exhaustive sub-scheduler than the idle bandwidth sub-scheduler servicing the same queue. The technique distributes the idle bandwidth of the resource in a way which is de-coupled from the guaranteed service rates of the queues, thereby providing a more efficient bandwidth distribution.

71 Claims, 7 Drawing Sheets

OTHER PUBLICATIONS

Zhang, H., "Service disciplines for guaranteed performance service in packet–switching networks", Proc. of the IEEE, vol. 83, No. 10:374–396, 1995.

Bennett, J.C.R. and Zhang, H., "Hierarchical packet fair queueing algorithms", Proc. ACM SIGCOMM, pp. 143–156, Standford, CA, Aug. 1996.

Floyd, S. and Jacobson, V., "Link–sharing and resource management models of packet networks", IEEE/ACM Trans. Networking, vol. 3, No. 4:365–386, 1995.

Goyal et al., "Start–time fair queuing: A scheduling algorithm for integrated services packet switching networks", Proc. ACM SIGCOMM, pp. 157–168, Stanford, CA, Aug. 1996.

Hung, A. "Bandwidth Scheduling and its Application in ATM Networks", PhD thesis, Section 3.7, U. of Waterloo, 1997.

Goyal et al., "Determining end–to–end delay bounds in heterogeneous networks", Proc. 5th International Workshop on Network and Operating System Support for Digital Audio and Video, pp. 273–284, Durham, NH, 1995.

Stiliadis, D. and Varma, A., "A General Methodology for Designing Efficient Traffic Scheduling and Shaping Algorithms", Proc. IEEE INFOCOMM, Japan, 1997.

* cited by examiner

TWO-COMPONENT BANDWIDTH SCHEDULER HAVING APPLICATION IN MULTI-CLASS DIGITAL COMMUNICATIONS SYSTEMS

FIELD OF INVENTION

The invention generally relates to the art of scheduling systems wherein messages associated with plural processes are stored in a number of queues for subsequent processing by a single resource having limited processing capability. The invention has particular application to the field of digital communications systems and in this aspect relates to a scheduler and related method for efficiently allocating the bandwidth of a communications link amongst multiple queues which may be associated with a variety of service classes.

BACKGROUND OF INVENTION

In various types of communication systems, including Asynchronous Transfer Mode (ATM) systems, situations often arise where a number of connections vie for the bandwidth of a communications link in a communication device, such as at a network node. When such a situation arises, it is necessary to queue or buffer data packets or cells from the contending connections, and the queues must be serviced in some "fair" way in order to ensure that all of the connections are adequately serviced.

A similar situation arises in the more general case where plural processes contend for a single resource. For instance, a distributed processing system may comprise a number of local controllers, responsible for various facets of the systems, which are connected to a central controller, responsible for the overall management of the system. The local controllers communicate with the central controller by sending it messages, which the central controller must process, i.e., act upon. In this sense, the local controllers present "jobs" to the central controller. At any instant of time, some of the local controllers will not be busy, having no messages which must be processed by the central controller. Concurrently, some of the local controllers will be busy, presenting multiple messages, and hence potential jobs, to the central controller. Since the central controller may be busy with other jobs, it stores the messages in various queues, e.g., according to the type or class of local controller from which the message originated, until such time the central controller can process the message and carry out the associated job. These messages must also be serviced in some fair way to ensure that all of the local controllers are adequately handled. It will be seen from the foregoing that the messages or jobs correspond to data packets of the digital communication system, and the fixed processing power or speed of the central controller corresponds to the bandwidth of the communications link.

A common "fair" scheduling scheme is proportional weighted fair queuing (hereinafter "proportional WFQ") wherein each queue, corresponding to each connection, is assigned a weight proportional to its allocated service rate. The proportional WFQ scheduler uses this weight to determine the amount of service given to the queue such that the scheduler is able to provide the allocated service rate for a given connection over a reasonably long busy period (i.e., when its queue is continuously non-empty), provided that the scheduler is not over-booked. The notion of an allocated service rate suits ATM systems in particular because almost all of the five currently defined ATM service classes rely on rate as a basis for defining quality of service (QoS). For instance, constant bit rate (CBR) connections are guaranteed a cell loss ratio (CLR) and delay for cells that conform to the peak cell rate (PCR). Variable bit rate (VBR) connections, real-time and non-real-time, are also guaranteed a CLR and delay for cells that conform to the sustained cell rate (SCR) and PCR. An available bit rate (ABR) connection is given a variable service rate that is between a minimum cell rate (MCR) and PCR. Unspecified bit rate (UBR) connections are associated with PCRs, and are soon anticipated to also be associated with MCRs.

In addition to the allocated service rate, because a proportional WFQ scheduler is work conserving, each non-empty queue will also receive a certain amount of instantaneous idle bandwidth. This is the extra service bandwidth that a queue receives due to (1) any unallocated bandwidth of a communications link, and (2) any allocated but currently unused bandwidth arising from the idle, non-busy periods of the other queues at the contention point.

To explain this in greater detail, suppose that queue n is given a weight $\phi_n$ which is proportional to the allocated service rate queue n should receive. The proportional WFQ scheduler thus distributes the total allocated bandwidth of the communication link amongst all the queues in proportion to their allocated service rates. Consequently, the idle bandwidth of the link is also distributed in proportion to the allocated service rates of all the non-empty queues. An example of this is shown in FIG. 1(a) where four queues 14, corresponding to four connections A, B, C & D, are serviced by a proportional WFQ multiplexer 8 in order to produce an output cell stream or link 16. Connections A, B & C have allocated service rates equal to 30% of the total bandwidth associated with the link 16 and are thus equally weighted. The allocated service rate of connection D is equal to 10% of the total bandwidth of link 16. FIG. 1(b) is a bandwidth occupancy chart illustrating how the link bandwidth is allocated to the connections. From time t=0 to 8, each of the connections has cells requiring servicing and thus the instantaneous bandwidth received by each connection is 25% of the total bandwidth. At time t=8, however, only connections B and D are non-empty having cells to be serviced, and thus the instantaneous idle bandwidth (now being 50% of the total bandwidth) is allocated to connections B & D in proportion to their allocated service rates. Thus, at time t=8, connection B receives 75% of the instantaneous total bandwidth and connection D receives 25% of the instantaneous total bandwidth. In general, the theoretical instantaneous service that queue n receives at time t when it is non-empty is $\phi_n / \Sigma_{i \in A(t)} \phi_i$ where A(t) is the index set of non-empty queues at time t.

Suppose then that a proportional WFQ scheduler is used in an ATM communications device, such as a network node. A CBR connection should have an allocated service rate equal to its PCR. A VBR connection should have an allocated service rate, VBW (virtual bandwidth), which is at least equal to its SCR and less than its PCR. (VBW is typically statistically calculated at set up by the connection and admission control (CAC) function of a network.) An ABR connection should have an allocated service rate equal to its SCR, and a UBR connection should have an allocated service rate equal to zero. So, in such an scenario, the amount of idle bandwidth that a CBR connection sees is proportional to its PCR, and that an ABR connection sees is proportional to its MCR. This may result in very undesirable service. For example, suppose that a switch is carrying four connections (only): one is CBR with PCR=980 kbps, two connections are ABR with MCR=10 kbps, and one is UBR. Consequently, the idle bandwidth distribution is 98% for the CBR connection and 1% for each of the ABR connections, assuming a period when all the connections are busy. Such a distribution is certainly not desirable, since CBR connections should generally not receive service bandwidth beyond their PCRs. ABR connections would get extra bandwidth in proportion to their MCRs; a phenomenon commonly termed MCR proportional service. MCR proportional service is one way of fairly distributing idle bandwidth fairly, but the literature has other methods such as MCR plus fair share which proportional WFQ cannot support. And the UBR connection only gets service if all the other queues are empty. Such distributions of the idle bandwidth are not optimal, and hence it is desired to achieve a more efficient distribution of the idle bandwidth.

SUMMARY OF INVENTION

Generally speaking, the invention provides a method for servicing a plurality of queues holding messages, such as data packets, destined for processing by a resource having a finite processing bandwidth, such as a communications link having a finite transmission bandwidth. The method comprises the steps of: (a) provisioning each queue with a minimum guaranteed service rate; (b) provisioning each queue with an idle bandwidth proportion; (c) servicing each queue by forwarding messages thereof to the resource at time intervals corresponding to the minimum guaranteed service rate of the queue, provided the queue is non-empty; and (d) servicing the queues in accordance with the proportion of idle bandwidth allocated to each queue during time intervals when none of the queues have packets being forwarded to the resource in conformance with step (c). In this manner, the amount of instantaneous idle bandwidth that a queue receives is decoupled from the allocated service rate granted to the queue.

In the preferred embodiment, the above method is carried out by a hierarchical scheduler which comprises (a) an exhaustive scheduler servicing a plurality of lower level schedulers in accordance with non-equal priority levels assigned thereto; (b) a non-work conserving shaper scheduler feeding the exhaustive scheduler; and (c) a work conserving idle bandwidth scheduler feeding the exhaustive scheduler. The exhaustive scheduler is configured so that the shaper scheduler is given exhaustive priority over the idle bandwidth scheduler. The hierarchical scheduler is coupled to the queues such that each queue concurrently contends for service from the shaper scheduler and from the idle bandwidth scheduler.

The non-work conserving shaper scheduler, such as a virtual clock shaper described below, generates a stream of data packets at a constant average bit rate. Since the shaper scheduler servicing a particular queue (which may correspond to one connection) has a higher priority than the work conserving idle bandwidth scheduler, such as a WFQ scheduler, the queue is guaranteed its allocated service rate during its busy period. However, the shaper scheduler does not always submit messages (or in the preferred embodiment, the identity of queues) to the exhaustive scheduler because not all queues are busy at all times, and even if a queue is busy, it may not be eligible to be serviced due to the non-work conserving nature of shaping. These periods constitute the idle bandwidth of the resource. During this "idle" time, the lower priority work conserving idle bandwidth scheduler servicing the queue is able to feed the exhaustive scheduler. The idle bandwidth scheduler distributes this idle bandwidth in manner which is preferably non-dependent upon the guaranteed service rates allocated to the queues. In the preferred embodiment, the idle bandwidth scheduler partitions the instantaneous idle bandwidth in a fixed manner or ratio between QoS classes, and equally between all connections associated with a particular QoS class.

In certain preferred embodiments, the shaper scheduler and the idle bandwidth scheduler are also each preferably composed of a plurality of sub-schedulers in order to more flexibly accommodate the distribution of idle bandwidth in an ATM application environment, as explained in greater detail below.

According to another broad aspect of the invention, there is provided a hierarchical scheduler for servicing a plurality of queues holding messages. This scheduler comprises an exhaustive sub-scheduler servicing a plurality of lower level sub-schedulers in accordance with non-equal priority levels assigned thereto; M non-work conserving shaper sub-schedulers feeding the exhaustive sub-scheduler; and N work conserving idle bandwidth sub-schedulers feeding the exhaustive sub-scheduler. A given queue concurrently contends for service form one of the shaper sub-schedulers and from one of the idle bandwidth sub-schedulers, and the shaper sub-scheduler servicing the given queue has a higher priority level with respect to the exhaustive sub-scheduler than the idle bandwidth sub-scheduler servicing the given queue.

BRIEF DESCRIPTION OF DRAWINGS

The foregoing and other aspects of the invention will become more apparent from the following description of the preferred embodiments thereof and the accompanying drawings which illustrate, by way of example only, the principles of the invention. In the drawings:

FIG. 1(*b*) is a bandwidth occupancy chart showing the how the link bandwidth is allocated to the queues over time by the prior art proportional WFQ scheduler under the conditions shown in FIG. 1(*a*);

DETAILED DESCRIPTION OF PREFERRED EMBODIMENTS

Figure 1A:
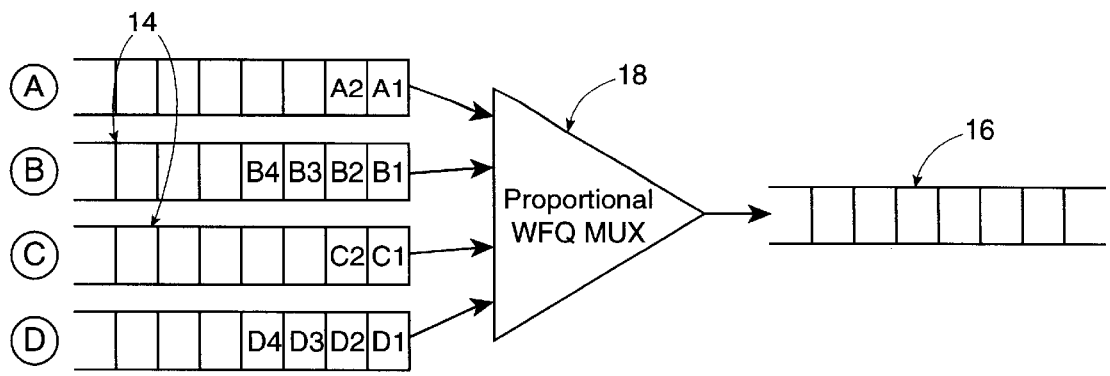
FIG. 1(*a*) is a diagram exemplifying the queue arbitration problem that a prior art proportional WFQ scheduler or multiplexer has to manage.
Figure 1B:
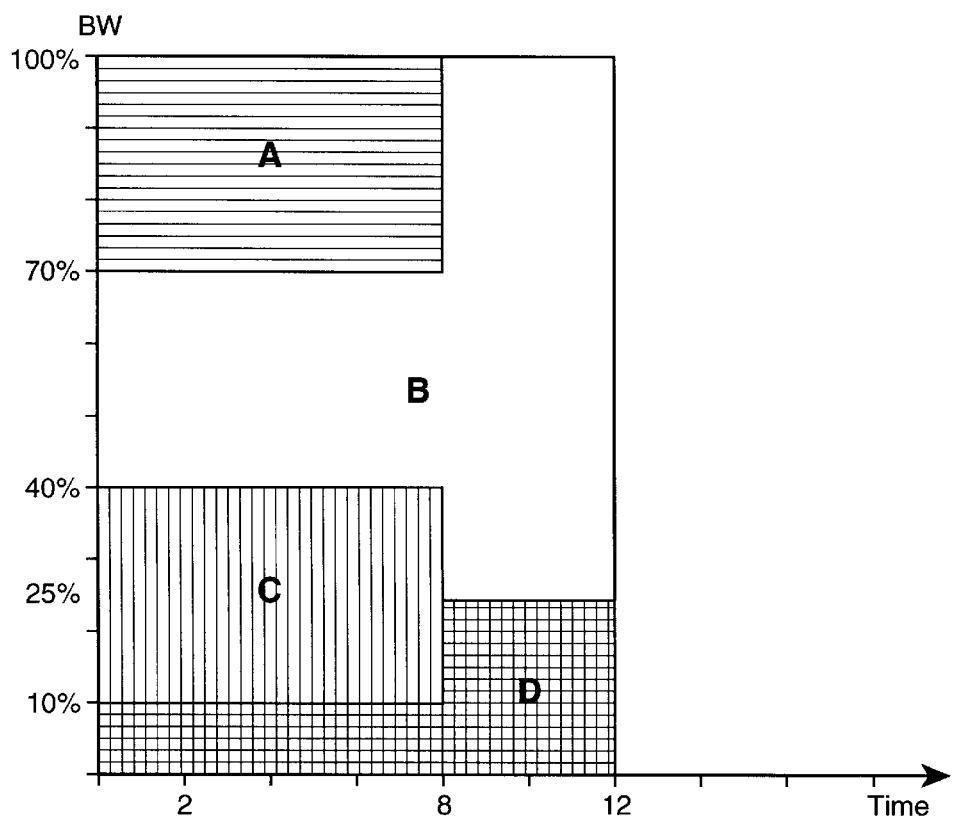
Figure 2:
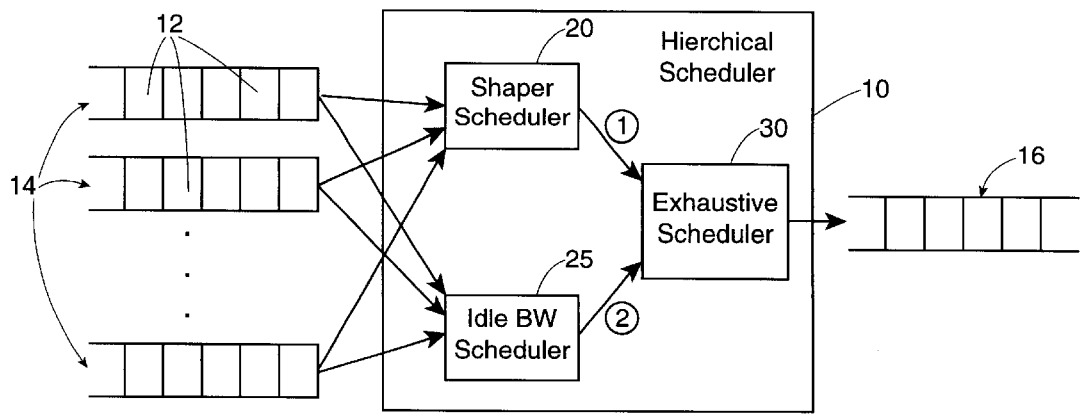
FIG. 2 is a functional block diagram illustrating a hierarchical scheduler in accordance with a first preferred embodiment of the invention.

FIG. 2 is a functional block diagram illustrating a hierarchical scheduler 10 in accordance with a first preferred embodiment. As described above, the task of scheduler 10 is to schedule data packets 12 stored in a plurality of input queues 14 to a limited resource, such as output communications link 16, which has a fixed bandwidth or service rate associated therewith. In the preferred embodiments, the data packets 12 are fixed length ATM or ATM-like cells. Furthermore, scheduler 10 is synchronous in that the data packets 12 are dequeued and transmitted to the communications link 16 at a rate corresponding to the fixed link bandwidth. In other words, the communications link 16 can be viewed as being logically divided into time slots, such that scheduler 10 de-queues one data packet 12 per time slot.

According to the first preferred embodiment, scheduler 10 comprises three "sub-schedulers" 20, 25 and 30, i.e., substantially independent schedulers, which are interconnected in a two-level, hierarchical, arrangement. (For notational purposes, sub-schedulers 20, 25 and 30 will be referred to merely as "schedulers" since these schedulers may themselves be composed of sub-schedulers, as shown, for example, in FIG. 3.) An exhaustive scheduler 30 is disposed at the top or primary level which provides the output to the communications link 16. The primary exhaustive scheduler, which is work conserving, serves a secondary non-work conserving shaper scheduler 20, described in greater detail below, and a secondary work conserving idle bandwidth scheduler 25 (such as a WFQ scheduler) also described in greater detail below. The two secondary schedulers 20 and 25 concurrently service the queues 14. The exhaustive scheduler 30, also known in the art as a static or strict priority scheduler, services processes in accordance with priority levels assigned thereto. Thus, at any given time, the primary exhaustive scheduler 30 services the secondary scheduler with the highest priority level, provided the latter is "busy", i.e., requires servicing. In the preferred embodiment, the secondary shaper scheduler 20 is assigned a higher priority level than the secondary idle bandwidth scheduler 25, thereby ensuring that the former will always be serviced ahead of the latter when busy.

The secondary schedulers 20 and 25 simultaneously "serve" the set of queues 14 by examining the queues and selecting one of them in order to dequeue a data packet therefrom. When the secondary schedulers 20 and 25 have selected a queue to serve, they do not remove data packets from the queues; instead queue identifiers are submitted to the primary scheduler 30. Thus, at each time slot, the secondary schedulers 25 and 30 simultaneously and independently submit the identifier of an eligible queue, if any, to the primary scheduler 30. Once the secondary schedulers 20 and 25 have submitted the queue identifiers, the primary scheduler 30 then serves the highest priority secondary scheduler which submitted an eligible queue by dequeuing the head-of-line (HOL) data packet from the queue identified by that secondary scheduler.

The secondary shaper scheduler 20 is preferably implemented as a virtual clock shaper similar to that described in Stiliadios, D. and Varma, A., "A General Methodology for Designing Efficient Traffic Scheduling and Shaping Algorithms", Proceedings of I.E.E.E. INFOCOM, Japan, 1997 (hereinafter "Siliadios"), which is incorporated herein by reference. Each queue is provisioned or associated with an a minimum guaranteed service rate, and the secondary shaper scheduler 20 provides a constant flow of data packets from each queue at its guaranteed service rate. Thus, if each queue 14 corresponds to a virtual connection, then each connection is provided with a constant average bit rate stream. The secondary shaper scheduler 20 is non-work conserving, and thus does not necessarily select a queue to be served every time slot.

The secondary idle bandwidth scheduler 25 is preferably implemented as a WFQ scheduler wherein each queue 14 is preferably provisioned or associated with a fixed WFQ weight corresponding to a pre-determined allocation of the instantaneous idle bandwidth of the communications link 16. Thus, for instance, each queue could be assigned with a WFQ weight of 1/N, where N is the total number of queues at any time. The secondary idle bandwidth scheduler 25 is work conserving, such that it submits an eligible queue to the primary scheduler 30 each and every time slot, provided that at least one queue has a packet stored therein.

It will be re-called that both secondary schedulers 20 and 25 simultaneously serve the queues 14. Since the shaper scheduler 20 has a higher priority than the work conserving scheduler 25, the queues are guaranteed their allocated service rates during their busy periods. However, at various times the shaper scheduler 20 does not always submit queues to the exhaustive scheduler 30 because 1) the shaper scheduler 20 is non-work conserving such that no queues require a packet to be submitted during a particular time period in order to maintain their minimum guaranteed service or shaper rates, or 2) all of the queues having non-zero shaper rates are empty during a particular time period (although queues having zero shaper rates may be busy). These time periods constitute the idle bandwidth of the communications link 16. During this "idle" time, the lower priority work conserving idle bandwidth scheduler 25 which always (provided not all of the queues are empty) selects an eligible queue every time slot is able to feed the primary scheduler 30, and hence distribute the idle bandwidth amongst the queues in accordance with the particular scheme provided by scheduler 25. In this way, the amount of instantaneous idle bandwidth a queue receives is decoupled from or independent of the guaranteed service rate assigned to it.

Other types of work conserving sub-schedulers may alternatively be used to allocate the idle bandwidth of a resource, such as communications link 16. However, generally speaking, since each queue contends for service from a shaper scheduler and from a work-conserving scheduler, wherein the former is granted exhaustive priority over the latter, then the work-conserving scheduler allocates a portion, or proportion, of the instantaneous idle bandwidth of the resource (hereinafter "idle bandwidth proportion") to the queue.

A preferred configuration for scheduler 10 for handling various ATM traffic service classes is shown in Table 1 below. In the preferred configuration, the idle bandwidth is "hard-partitioned" between the various ATM service classes, and each queue is associated with one virtual connection, which in turn is associated with one of the ATM traffic classes. The idle bandwidth proportion that the rtVBR.2/3, nrtVBR, ABR and UBR service classes receive are $\rho_1$, $\rho_2$, $\rho_3$, and $\rho_4$, respectively, where $\rho_1+\rho_2+\rho_3+\rho_4=1$. The idle bandwidth allocated to each service class is divided equally amongst connections belonging to the same class. Alternatively, the idle bandwidth allocated to each service class could be divided amongst connections of the same class in proportion to their guaranteed minimum service rates. Other schemes are also possible.

TABLE 1

| ATM Service Class | Guaranteed Minimum Service Rate per queue (shaper rate) | Idle Bandwidth Proportion per queue (WFQ weight) |
| --- | --- | --- |
| CBR | PCR | ∞ |
| rtVBR.1 | VBW | ∞ |
| rtVBR.2/3 | VBW | $\rho_1/N_{rtVBR.2/3}$ |
| nrtVBR | VBW | $\rho_2/N_{nrtVBR}$ |
| ABR | MCR | $\rho_3/N_{ABR}$ |
| UBR | MCR | $\rho_4/N_{UBR}$ |

The CBR and rtVBR.1 queues are assigned a weight of ∞ to ensure that CBR and rtVBR.1 traffic receive priority service over non-real-time traffic and rtVBR.2/3 traffic. In practice, such sources are typically subject to usage parameter control (UPC), i.e., a type of policing function to ensure that a connection is abiding with its traffic contract, and thus tend not to be bursty (i.e., conforming to their CDVTs.) Alternatively, other means may be provided in a communications system for shaping such sources to ensure conformance to the traffic contract. See for example co-pending Canadian patent application no. 2,229,577, filed Feb. 12, 1998, and assigned to the instant assignee. As such, CBR and nrtVBR.1 connections will generally rarely utilize the instantaneous idle bandwidth managed by scheduler 25.

The rtVBR.2/3 service class is treated as a non-real time class with respect to the distribution of idle bandwidth because of the nature of its traffic contract which only requires an ATM communications device, such a network node having connection admission control (CAC), to guarantee service to CLP 0 cells but not low priority CLP 1 cells. See, for instance, ATM FORUM doc. no. af-tm-0056.000, "Traffic Management Specification, Version 4.0" April 1996, all of which is incorporated herein by reference. CLP 0 cells are subject to two bucket UPC (i.e., PCR conformance and SCR conformance) and thus typically tend to be well-behaved. However, CLP 1 cells are only subject to one bucket UPC (i.e., only PCR conformance) such that an aggregate CLP0+1 stream is only constrained by a PCR bucket. Accordingly, it is possible for CLP 1 cells from numerous rtVBR.2/3 connections to arrive at the node in extended bursts. If the rtVBR.2/3 traffic class were granted an idle bandwidth proportion of ∞ as the other real time traffic classes, then the CLP 1 cells could cause service starvation of the non-real time traffic such as UBR, thereby flooding the node. However, CLP 1 cells may in fact be discarded or alternatively delayed to the same (or worse) extent than that of the non-real time traffic. Thus, by assigning the rtVBR-2/3 traffic a finite idle bandwidth proportion similar to the non-real time traffic, this problem may be avoided.

Figure 3:
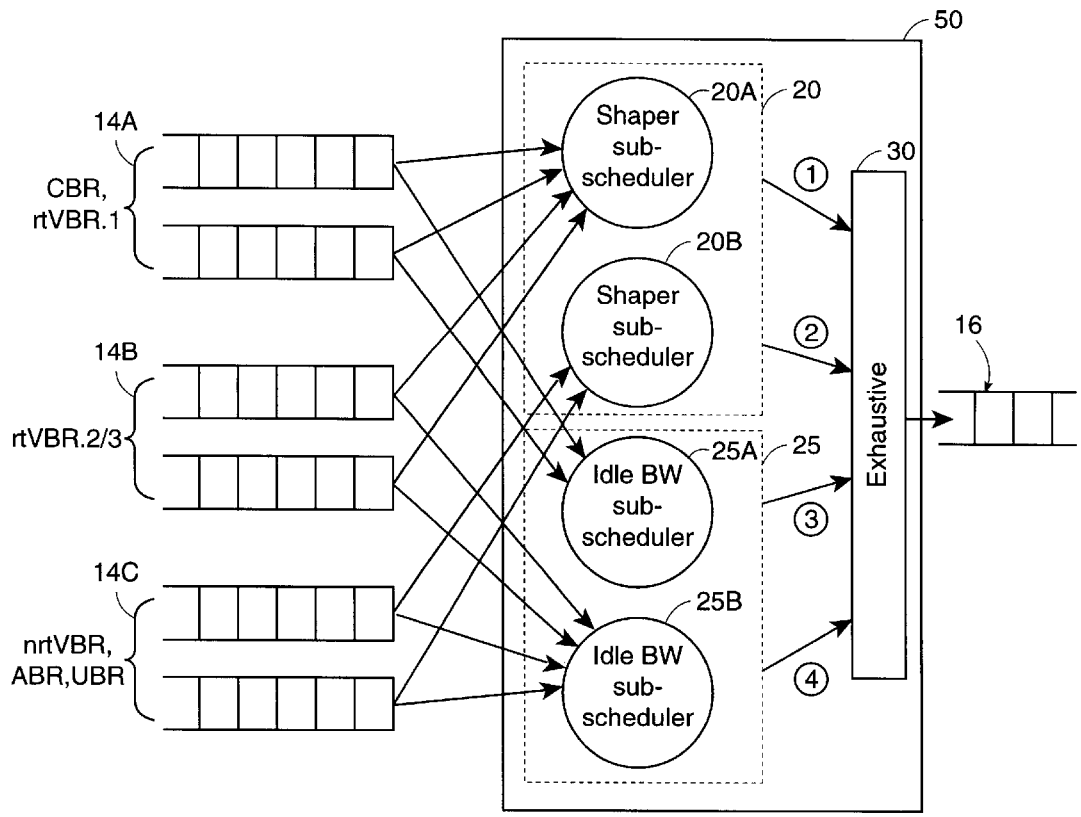
FIG. 3 is a functional block diagram illustrating a hierarchical scheduler in accordance with a second preferred embodiment of the invention.

FIG. 3 shows a hierarchical scheduler 50 according to a second preferred embodiment. In this embodiment, the secondary shaper scheduler 20 is composed of two shaper sub-schedulers 20A and 20B, and the secondary idle bandwidth scheduler 25 is composed of two work conserving sub-schedulers 25A and 25B. Queues 14A, which are associated with the CBR and rtVBR.1 ATM traffic classes, are concurrently serviced by shaper sub-scheduler 20A and work conserving sub-scheduler 25A. Queues 14B, which are associated with the rtVBR.2/3 ATM traffic classes, are concurrently serviced by shaper sub-scheduler 20A and work conserving sub-scheduler 25B. Queues 14C, which are associated with the non-real time ATM traffic classes, are concurrently serviced by shaper sub-scheduler 20B and work conserving sub-scheduler 25B. The order of priority associated with the secondary sub-schedulers is 20A, 20B, 25A and 25B, from highest to lowest priority.

A preferred configuration for scheduler 50 for handling the various ATM traffic service classes is shown in Table 2 below. As before, each queue is associated with a single virtual connection and each queue/virtual connection is ensured its guaranteed minimum service rate, yet, due to the priority of shaper sub-scheduler 20A over 20B, real time traffic is scheduled ahead of non-real time traffic when shaping. As before, the critical real time traffic (CBR and rtVBR.1) classes also receive idle bandwidth in preference to the other traffic classes. However, the second embodiment provides a mechanism for better managing the distribution of idle bandwidth amongst the critical real-time traffic. This is because the idle bandwidth that the CBR and rtVBR service classes receive relative to one another is $\alpha_1:\alpha_2$, where $\alpha_1+\alpha_2=1$, and the allocated idle bandwidth per service class is divided equally amongst connections belonging to the same class. In this manner, the idle bandwidth proportion allocated to a CBR or rtVBR.1 queue can be well controlled, unlike the first embodiment, while still giving these service classes preferential treatment in receiving idle bandwidth over the other service classes.

TABLE 2

| ATM Service Class | Guaranteed Minimum Service Rate per queue (shaper rate) | Idle Bandwidth Proportion per queue (WFQ weight) |
| --- | --- | --- |
| CBR | PCR | $\alpha_1/N_{CBR}$ |
| rtVBR.1 | VBW | $\alpha_2/N_{rtVBR.1}$ |
| rtVBR.2/3 | VBW | $\rho_1/N_{rtVBR.2/3}$ |
| nrtVBR | VBW | $\rho_2/N_{nrtVBR}$ |
| ABR | MCR | $\rho_3/N_{ABR}$ |
| UBR | MCR | $\rho_4/N_{UBR}$ |

It will also be noted from the second embodiment that the rtVBR.2/3 queues are treated as a separate group, serviced by the high priority shaper sub-scheduler 20A along with the other real time classes, but serviced by the lowest priority idle bandwidth sub-scheduler 25B, similar to the non-real time traffic classes.

This is done to prevent CLP 1 flooding for the reasons stated above.

Figure 4:
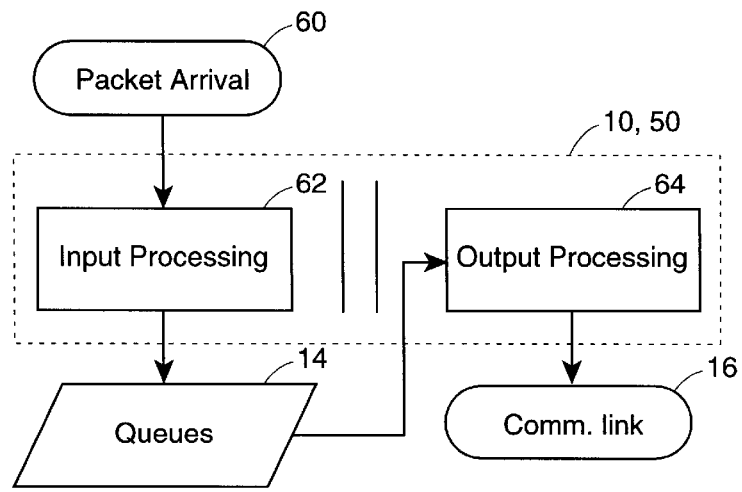
FIG. 4 is a flowchart illustrating, at a high level, a method according to the first and second preferred embodiments for implementing the hierarchical scheduler shown in FIGS. 2 and 3.

FIG. 4 is a flowchart illustrating, at a high level, a method according to the first and second preferred embodiments for implementing hierarchical schedulers 10 and 50. The preferred method uses a form of time stamping, as described in greater detail below, for keeping track of when queues should be serviced. Thus, in the event 60 of the arrival of a data packet 12, an input processing stage 62 issues the time stamp, as required. In parallel, an output processing stage 64 dequeues data packets 12 from queues 14 for transmission to the communications link 16, as well as issues time stamps under certain circumstances.

In the preferred method, each queue 14 is associated with two time stamps, called theoretical emission times (TETs). One of these time stamps (hereinafter "shaper TET") is used by the secondary shaper scheduler 20, and the other times stamp is used by the preferred secondary WFQ idle bandwidth scheduler 25 (hereinafter "WFQ TET"). The preferred method differs from the virtual clock shaping technique described in Stiliadios, supra, in that in the prior art reference, each packet has a time stamp associated with it whereas in the preferred embodiments time stamping is performed at the level of each queue. The inventors have found that time stamping per queue is likely more economical to implement in practice because of lower memory storage requirements.

Both time stamps of a queue change whenever a new packet reaches the head-of-line (HOL) position in the queue. This happens either when (a) a data packet arrives at an empty queue, or (b) a data packet has just been served and its queue has a following data packet waiting to be serviced which progresses to the HOL position.

If a packet has just been served and its queue has no more packets waiting, its time stamps are no longer valid, i.e., the queue is no longer considered eligible for scheduling by the secondary shaper scheduler 20 and the preferred WFQ secondary idle bandwidth scheduler 25 (including any sub-schedulers thereof).

According to the preferred method, when a packet arrives at an empty queue i, thereby placing the packet at the HOL position thereof, the shaper TET (i.e., for the purposes of the secondary shaper sub-schedulers) of a given queue i at a current time RTP (real time pointer) is:

$$TET_i = \max\{TET_i, RTP\} + 1/R_i, \quad (1)$$

where $R_i$ is the shaper rate of queue i.

In the event a packet is dequeued in queue i such that another packet waiting in the queue reaches the HOL position, the shaper TET of queue i is:

$$TET_i = RTP + 1/R_i. \quad (2)$$

The shaper time stamp stays with the queue until it is served. At each time slot, the secondary shaper scheduler 20 (or shaper sub-schedulers 20A and 20B in the second embodiment) serves the queue with the smallest shaper TET out of all eligible queues. A queue i is eligible if $$TET_i - 1/R_i \leq RTP. \quad (3)$$

Mathematically, the index, j, of the chosen queue is expressed as:

$$j = \arg\{\min_i \{TET_i | TET_i - 1/R_i \leq RTP\}\}. \quad (4)$$

In the preferred embodiments, the WFQ sub-scheduler which functions as the secondary work conserving scheduler 25 (or sub-schedulers 25A and 25B thereof in the second embodiment) also time stamp each queue serviced. This can be accomplished with a self-clocked fair queuing scheme (SCFQ), described in greater detail, for instance, in Goyal et al., "Start-Time Fair Queuing: A Scheduling Algorithm for Integrated Services Packet Switching Networks", *IEEE/AICM Trans. Networking*, Vol. 5, No. 5, October 1970, and incorporated herein by reference (hereinafter "Goyal"). With SCFQ, when a new packet arrives at the HOL position of a queue i, the WFQ TET is:

$$TET_i = \max\{TET_i, VTP\} + 1/\phi_i, \quad (5)$$

where VTP (virtual time pointer) is the WFQ TET value of the queue that was last served by the WFQ scheduler, and $\phi_i$ is the WFQ weight of queue i. (Note that each WFQ scheduler has a VTP variable associated with it. In contrast, all shapers employ a common RTP variable since it is a measure of real time.)

Alternatively, the time stamping for the preferred WFQ sub-scheduler may be carried out with a start-time fair queuing scheme (SFQ) described in greater detail in Goyal, supra. With SFQ, when a new packet arrives at the HOL position of queue i, the WFQ TET is:

$$TET_i = \max\{TET_i + 1/\phi_i, VTP\}, \quad (6)$$

where VTP, again, is the WFQ TET value of the queue that was last served, and $\phi_i$ is the WFQ weight of queue i.

Figure 5:
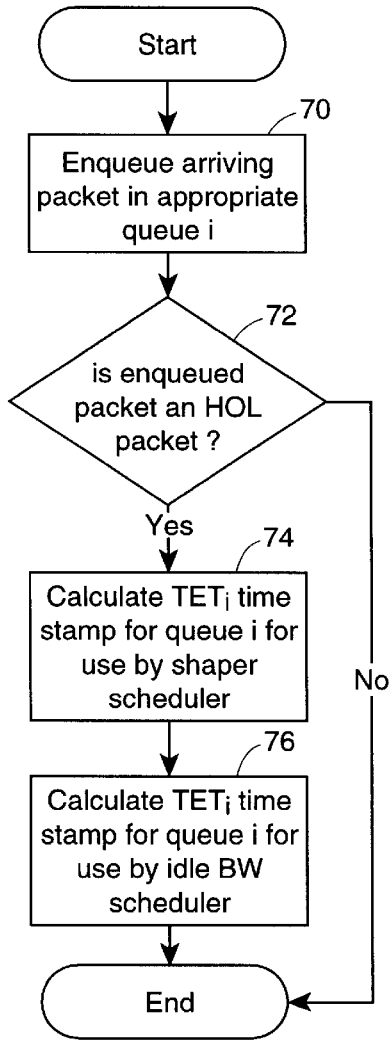
FIG. 5 is a flowchart illustrating a packet pre-processing stage of the flowchart of FIG. 4 in greater detail.

FIG. 5 is a flowchart illustrating the input processing stage 62 (of FIG. 4) in greater detail. An initial step 70 enqueues the arriving packet in the appropriate queue 14. The incoming packets may be queued using a variety of queuing schemes, for instance, per priority queuing according to QoS or ATM traffic classes (such as shown in FIG. 3), per VC queuing, per port queuing, or combinations of the foregoing. Step 72 checks whether the packet enqueued in step 70 was placed at the head of the corresponding queue. If not, the process terminates. Otherwise, step 74 calculates the time stamp for the appropriate queue for subsequent use by the shaper scheduler 25 in accordance with equation (1). Similarly, step 76 calculates the time stamp for the appropriate queue for subsequent use by the preferred WFQ scheduler in accordance with one of equations (5) and (6), as desired.

Figure 6:
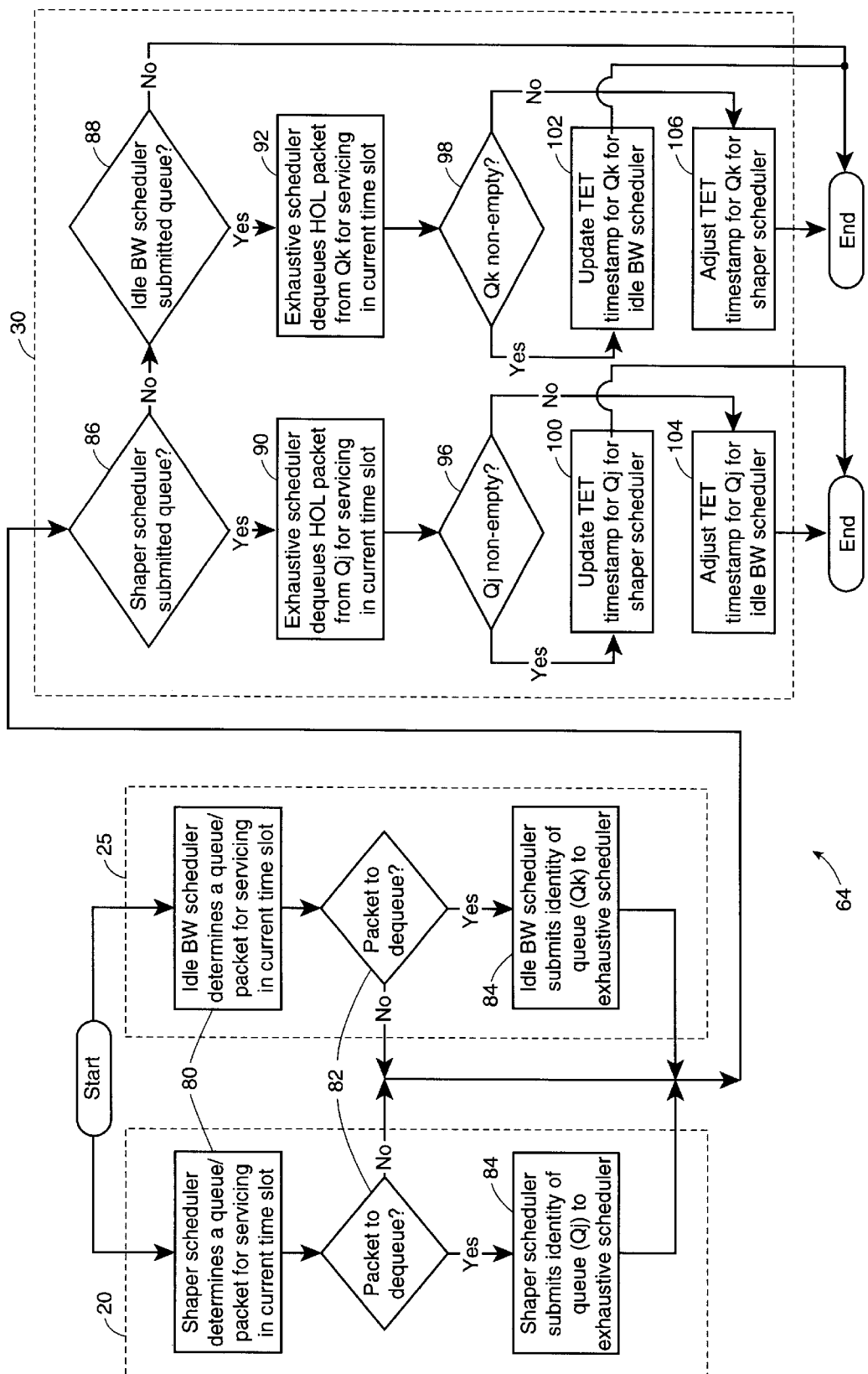
FIG. 6 is a flowchart illustrating an output processing stage of the flowchart of FIG. 4 in greater detail in accordance with the first preferred embodiment.

FIG. 6 is a flowchart illustrating the output processing stage 64 (of FIG. 4) in greater detail for one time slot. In an initial step 80, the secondary shaper and idle bandwidth schedulers 20 and 25 (which are preferably implemented as separate independent computer processes or threads of execution) concurrently and independently select a queue, if any, for servicing in the current time slot. In the case of the shaper scheduler 20, the queue selection is made in accordance with equation (4). The idle bandwidth scheduler 20 selects the queue having the lowest valued TET.

At step 82, each of the secondary shaper and idle bandwidth schedulers 20 and 25 concludes whether or not a packet should be dequeued. If so, then at step 84, the secondary schedulers 20 and 25 submit the identities, $Q_J$ and $Q_K$, of the respectively selected queues to the exhaustive scheduler 30.

At step 86, the primary exhaustive scheduler 30 checks whether or not the secondary shaper scheduler 20 has submitted a queue for servicing. If so, then at step 90 the primary exhaustive scheduler 30 dequeues the HOL packet from queue $Q_J$ and forwards the packet to the communications link 16. At step 96 queue $Q_J$ (the queue just served) is examined to determine whether it is empty or not. If it not empty, then a following packet within queue $Q_J$ becomes an HOL packet and thus at step 100 the shaper TET for queue $Q_J$ is updated in accordance with equation (2). However if queue $Q_J$ is empty, then control passes to step 104. In this event, an adjustment is made to the WFQ TET for queue $Q_J$ as follows:

$$TET_{Q_J} = TET_{Q_J} - \frac{1}{\phi_{Q_J}}.$$

This adjustment is made because time stamping system operates on the principle of accumulated "credits" as will be understood to those skilled in the art, and thus since the secondary idle bandwidth scheduler 25 did not in fact service queue $Q_J$, its credit in respect of the secondary scheduler 25 is preferably corrected before the next packet, which will be an HOL packet, arrives in queue $Q_J$.

If at step 86 the secondary shaper scheduler 20 has not submitted a queue for servicing, then at step 88 the primary exhaustive scheduler 30 checks whether or not the secondary idle bandwidth scheduler 25 has submitted a queue for servicing. If so, then at step 92 the primary exhaustive scheduler 30 dequeues the HOL packet from queue $Q_K$ and forwards the packet to communications link 16. At step 98, queue $Q_K$ (the queue just served) is examined to determine whether it is empty or not. If it is not empty, then a following packet within queue $Q_K$ becomes an HOL packet and thus at step 102 the WFQ TET time stamp for queue $Q_K$ is updated in accordance with one of equations (5) and (6) as desired. However if queue $Q_K$ is empty, then control passes to step 106. In this event, a credit adjustment for the reasons previously described is now made to the shaper TET as follows:

$$TET_{Q_K} = TET_{Q_K} - \frac{1}{R_{Q_K}}.$$

Figure 7:
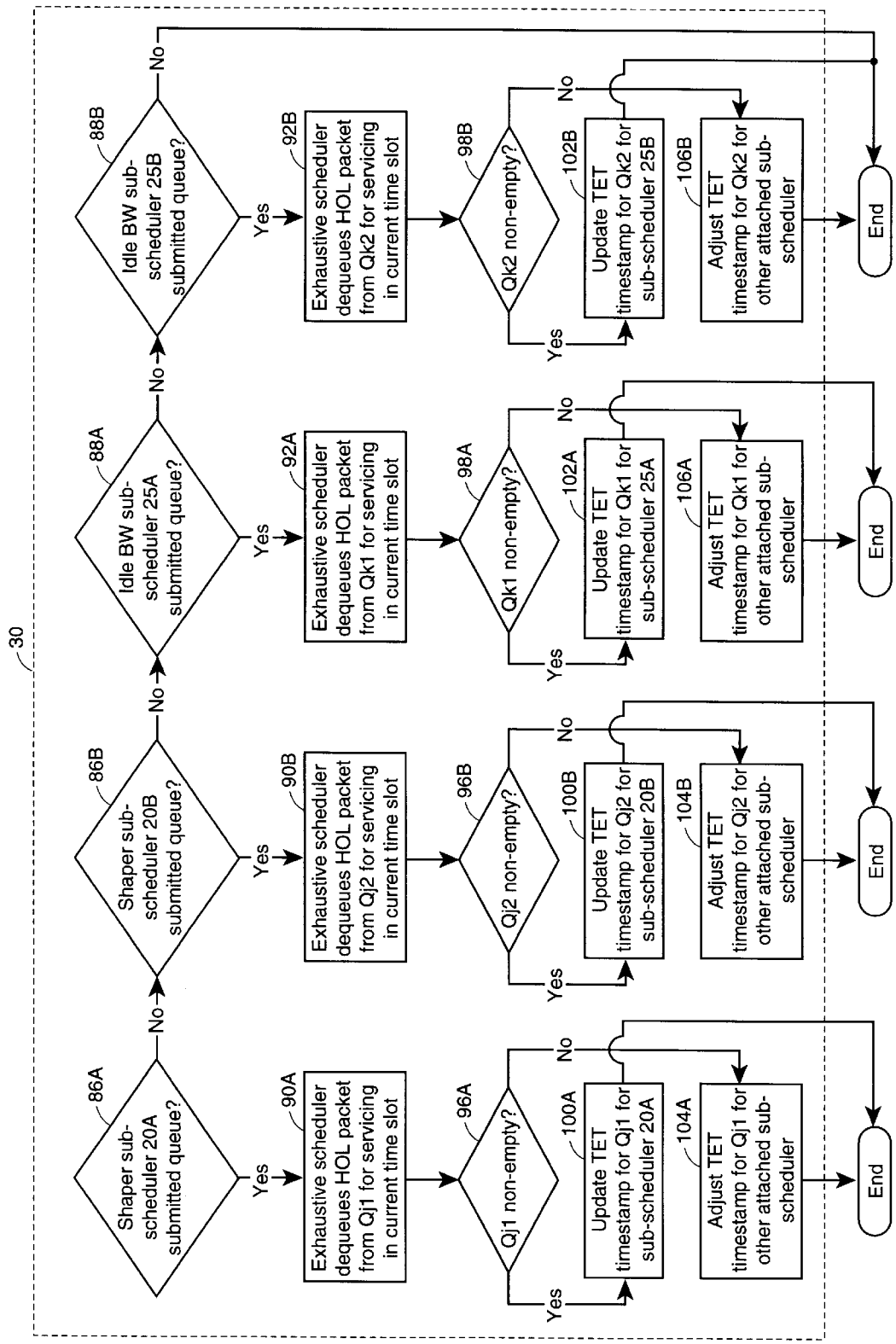
FIG. 7 is a flowchart illustrating an embellishment to the output processing stage shown in the flowchart of FIG. 6 in accordance with the second preferred embodiment.

FIG. 7 shows the processing carried out by the primary exhaustive scheduler 30 specifically for the case of the second embodiment (FIG. 4). It will be noted that a query is made of each of the secondary sub-schedulers 20A, 20B, 25A, and 25B, in that order, to determine whether or not they have submitted queues, and are serviced accordingly in a manner similar to that described above.

Figure 8:
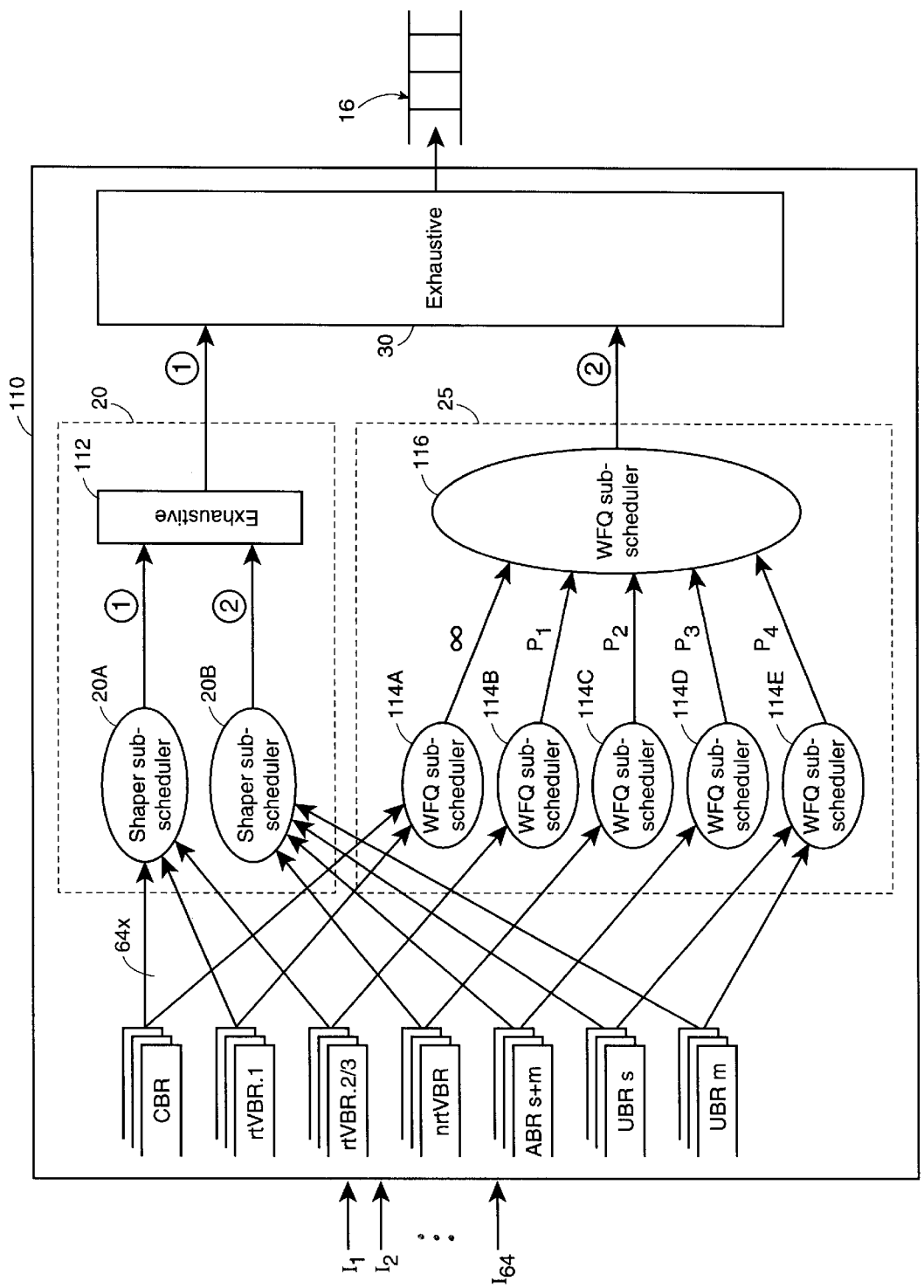
FIG. 8 is a functional block diagram illustrating a hierarchical scheduler in accordance with a third preferred embodiment of the invention.

FIG. 8 shows a tertiary level hierarchical scheduler 110 according to a third preferred embodiment. In this embodiment, the scheduler 110 services sixty-four inputs $I_1-I_{64}$, each of which carries multiple connections from any of the various ATM traffic classes. The cells from each input are stored in a set of queues. Each set comprises at least one queue from each traffic class. Thus, for example, there are sixty-four CBR queues in total, one for each input; and sixty-four nrtVBR queues in total, one for each input. UBR traffic is divided into two sections: "UBR m" refers to multicast UBR traffic; "UBR s" refers to single-cast UBR traffic.

In this embodiment, the shaper scheduler 20 is composed of two shaper sub-schedulers 20A and 20B which feed an exhaustive sub-scheduler 112 (which in turn feeds exhaustive scheduler 30). Shaper sub-scheduler 20A services the real time traffic classes, and shaper sub-scheduler 20B services the non-real time traffic classes (and rtVBR.2/3). Shaper sub-scheduler 20A has a higher priority with respect to exhaustive sub-scheduler 112 than shaper sub-scheduler 20B, in a manner similar to the second preferred embodiment shown in FIG. 3.

The idle bandwidth scheduler 25 is composed of five tertiary WFQ sub-schedulers 14A–E which feed a secondary WFQ sub-scheduler 116. In this hierarchy, the weights of the secondary WFQ sub-scheduler 116 correspond to a portion of idle bandwidth allocated to an ATM traffic group as a whole, and the weights of a given tertiary WFQ sub-scheduler 114 divide up the portion of idle bandwidth allocated to the corresponding ATM traffic group amongst the queues of that group.

A preferred configuration for scheduler 110 is shown in Table 3, below. In the table, the notation "$\Sigma_{rtVBR.2/3,\ queue}$ VBW" means, for example, the sum of the VBWs of all connections sharing a particular rtVBR.2/3 queue, and "$\Sigma_{rtVBR.2/3}$ VBW" means the sum of the VBWs of all rtVBR.2/3 connections on all inputs, i.e., in the entire system. In addition, the notation "$N_{UBR,queue}$" and "$N_{UBR}$" respectively denote, for example, the number of UBR connections in a particular queue, and the total number of UBR connections on all inputs.

TABLE 3

| ATM Service Class | Guaranteed Minimum Service Rate per queue (shaper rate) | Tertiary WFQ weight (per queue) | Secondary WFQ Weight (per class) |
|---|---|---|---|
| CBR | $\Sigma_{CBR,queue}$ PCR | $\Sigma_{CBR,queue}$ PCR/$\Sigma_{CBR}$ PCR | $\infty$ |
| rtVBR.1 | $\Sigma_{rtVBR.1,queue}$ VBW | $\Sigma_{rtVBR.1,queue}$ VBW/$\Sigma_{rtVBR.1}$ VBW | |
| rtVBR.2/3 | $\Sigma_{rtVBR.2/3,queue}$ VBW | $\Sigma_{rtVBR.2/3,queue}$ VBW/$\Sigma_{rtVBR.2/3}$ VBW | $\rho_1$ |
| nrtVBR | $\Sigma_{nrtVBR,queue}$ VBW | $\Sigma_{nrtVBR,queue}$ VBW/$\Sigma_{nrtVBR}$ VBW | $\rho_2$ |
| ABR | $\Sigma_{ABR,queue}$ MCR | $N_{ABR,queue}/N_{ABR}$ | $\rho_3$ |
| UBR | $\Sigma_{UBR,queue}$ MCR | $N_{UBR,queue}/N_{UBR}$ | $\rho_4$ |

As before, the ATM service classes are divided into three distinct groups as follows: (1) critical real time traffic (CBR and rtVBR.1 queues); (2) real-time traffic with CLP1 cells that can be dropped (rtVBR.2 and rtVBR.3), and (3) non-real time traffic (nrtVBR, UBR and ABR.) The first and second groups (queues associated with real time traffic) have exhaustive priority over the third group (queues associated with non-real time traffic) with respect to shaper sub-schedulers 20A and 20B. This ensures that the real-time queues get the bandwidth allocated to them by the CAC with minimal delay.

With respect to the allocation of the idle bandwidth, the first group of critical real time traffic queues (whose connections have QoS guarantees for both CLP 0 and CLP 1 cells) receive exhaustive priority over the non-real time traffic since they are assigned a weight of $\infty$. The rtVBR.2/3 traffic class is not included in this category as rtVBR.2/3 traffic has CLP 1 cells which have no QoS guarantees. Instead, the idle bandwidth is distributed in a finite manner by the secondary WFQ sub-scheduler 116 by giving the aggregate rtVBR2/3, nrtVBR, UBR and ABR traffic some predetermined ratio, $\rho_i$, of the total available idle bandwidth. Within the rtVBR.2/3 and nrtVBR traffic classes, the idle bandwidth of the service class is divided amongst the queues in proportion to the guaranteed service rates of the connections carried by the queues. Within the ABR and CBR classes, the idle bandwidth allocated to each class is distributed approximately equally amongst all connections in the class. Of course, it is also possible to achieve proportional distribution of the idle bandwidth by setting the weights of the tertiary sub-schedulers 114D and 114E for each queue to $\Sigma_{nrtVBR,queue}$ MCR/$\Sigma_{nrtVBR}$ MCR.

The two-level hierarchy of scheduler 25 also provides a more flexible arrangement for distributing the idle bandwidth allotment within a given service class. For example, consider a scenario where there are five queues in total in the nrtVBR class, and the class is allocated 20% of the idle bandwidth. If all five queues are active, then each queue receives $\frac{1}{5}^{th}$ of 20% of the allocated idle bandwidth. However, if only one of the five queues is active, then due to the work conserving nature of WFQ, that queue would always be served by the appropriate tertiary WFQ sub-scheduler 114 which, in turn, receives 20% of the idle bandwidth from the secondary WFQ sub-scheduler 116. Thus, the only busy queue in the class receives 20% of the idle bandwidth. In contrast, in the second embodiment shown in FIG. 3, each queue has an idle bandwidth proportion of $\rho/N$, and thus under the presented scenario the busy queue would only receive approximately $\frac{1}{5}^{th}$ of 20% of the idle bandwidth (with the other 16% divided up amongst all busy schedulers).

Figure 9:
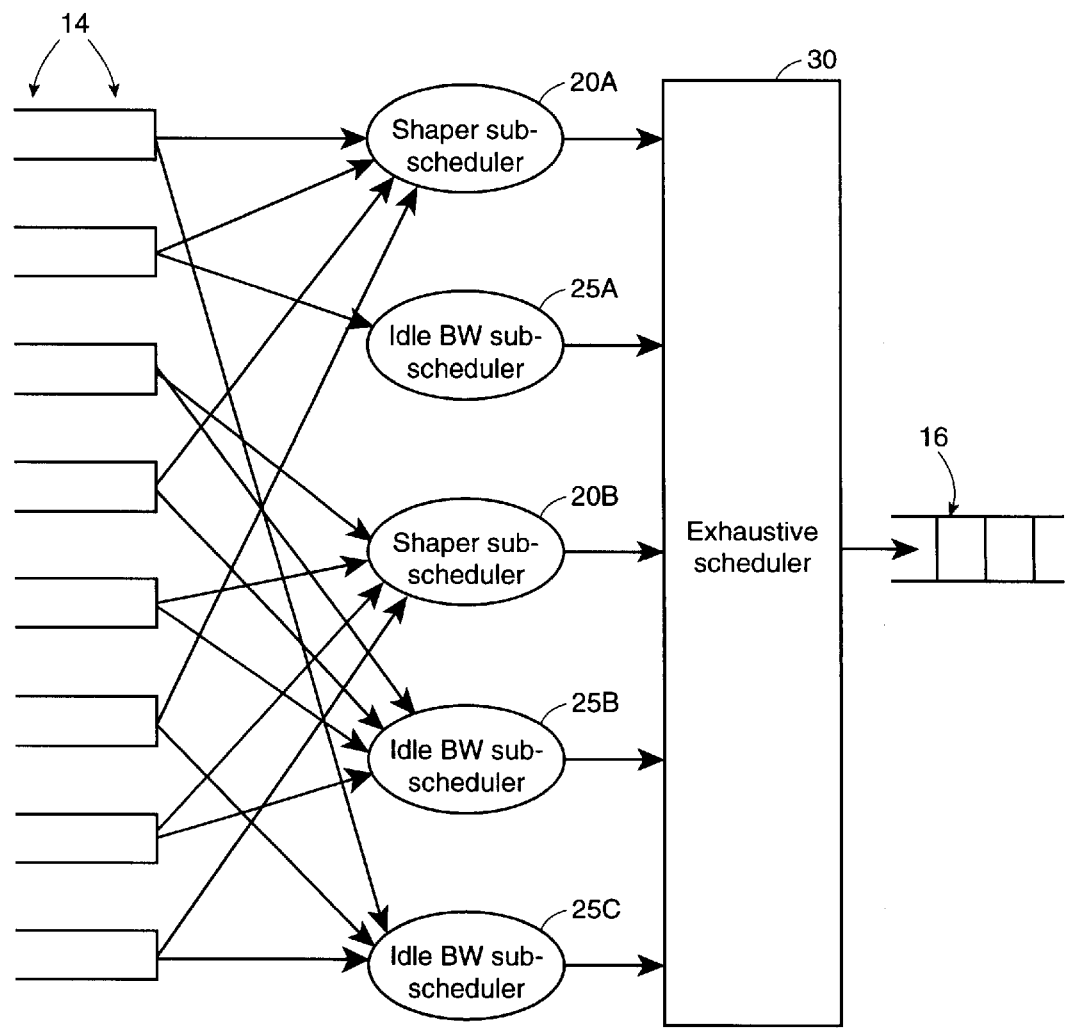
FIG. 9 is a functional block diagram illustrating a hierarchical scheduler in accordance with a fourth preferred embodiment of the invention.

The preferred hierarchical schedulers described above have been configured relative to an ATM applications environment. It will be understood that the hierarchical schedulers can be configured for other types applications. In the general case, the hierarchical schedulers may comprise M non-work conserving shaper sub-schedulers feeding an exhaustive sub-scheduler, and N work conserving idle bandwidth sub-schedulers feeding the exhaustive sub-scheduler, provided that a queue is concurrently contending for service from one of the shaper sub-schedulers and from one of the idle bandwidth sub-schedulers, and the shaper sub-scheduler serving the queue has a higher exhaustive priority level than the idle bandwidth sub-scheduler serving the same queue. FIG. 9 shows an example of such a hierarchical scheduler where M=2 and N=3.

It should also be understood that the communications link 16 may represent a transmission media, or alternatively, an internal bus or pathway in a communications device. Similarly, it should be appreciated that the preferred embodiments may be applied in other types of applications where a number of processes generate various types of messages or jobs which are stored in a plurality queues for subsequent processing by a single resource having a finite processing capability or bandwidth. Moreover, while the preferred embodiments have made reference to synchronous sub-schedulers schedulers operating on fixed length data packets over equal time periods, in alternative embodiments of the invention the schedulers may be asynchronous in nature and operate on variable length data packets. Similarly, those skilled in the art will appreciate that other modifications and variations may be made to the preferred embodiments disclosed herein without departing from the spirit of the invention.

What is claimed is:

1. A method for servicing a plurality of queues holding messages destined for processing by a resource having a finite processing bandwidth, said method comprising the steps of:
   (a) provisioning each queue with a minimum guaranteed service rate;
   (b) provisioning each queue with an idle bandwidth proportion, at least one of said idle bandwidth proportions being non-zero;
   (c) servicing each queue by forwarding messages thereof to the resource at time intervals approximately equivalent to the minimum guaranteed service rate of the queue, provided the queue is non-empty; and
   (d) during time intervals when none of the queues have messages being forwarded to the resource in conformance with step (c), servicing the queues in accordance with the proportion of idle bandwidth allocated to each queue.

2. The method according to claim 1, wherein the resource is a data processor.

3. The method according to claim 2, wherein in step 1(d) the queues are serviced using a work conserving, weighted fair queuing (WFQ) scheme, and the idle bandwidth proportion is a WFQ weight.

4. The method according to claim 1, wherein the resource is a communications link, the finite processing bandwidth is a communications link bandwidth, and the messages are data packets.

5. The method according to claim 4, wherein in step 1(d) the queues are serviced using a work conserving, weighted fair queuing (WFQ) scheme, and the idle bandwidth proportion is a WFQ weight.

6. The method according to claim 5, wherein the idle bandwidth proportion for each queue is a predetermined fixed ratio.

7. The method according to claim 5, wherein the idle bandwidth proportion of each queue is proportional to its instantaneous length.

8. The method according to claim 5, wherein the queues are grouped into service classes, each being provisioned with a fixed ratio idle bandwidth proportion, and the idle bandwidth proportion of a given queue within a given service class is equal to the fixed ratio idle bandwidth proportion of the given service class divided by the total number queues associated with the given service class.

9. The method according to claim 8, wherein each queue is associated with a virtual connection.

10. The method according to claim 5, wherein the queues are grouped into service classes, each being provisioned with a fixed ratio idle bandwidth proportion, and the idle bandwidth proportion of a given queue within a given service class is proportional to its minimum guaranteed service rate relative to the guaranteed service rates of the other queues within the given service class.

11. The method according to claim 10, wherein each queue is associated with a virtual connection.

12. The method according to claim 5, wherein in step 1(c) the packets of each queue are shaped to yield the minimum guaranteed service rate of the queue.

13. The method according to claim 12, wherein the shaping step and the WFQ step are concurrently carried out, the shaping step having exhaustive priority over the WFQ step.

14. The method according to claim 13, further including the step of enqueuing the data packets and time stamping one of the data packet and its corresponding queue.

15. The method according to claim 14, further including the step of de-queuing the data packets and time stamping the corresponding queue.

16. The method according to claim 14, wherein the data packets are of fixed size.

17. The method according to claim 16, wherein the shaper and WFQ steps are synchronous.

18. Apparatus for servicing a plurality of queues holding messages destined for processing by a resource having a finite processing bandwidth, said apparatus comprising:
   means for provisioning each queue with a minimum guaranteed service rate;
   means for provisioning each queue with an idle bandwidth proportion, at least one of said idle bandwidth proportions being non-zero;
   first means for servicing each queue by forwarding the messages thereof to the resource at time intervals corresponding to the minimum guaranteed service rate of the queue, provided the queue is non-empty; and
   second means for servicing the queues in accordance with the proportion of idle bandwidth allocated to each queue during time intervals when none of the queues have messages being forwarded to the resource by the first means for servicing the queues.

19. The apparatus according to claim 18, wherein the first and second means for servicing the queues comprises:
   an exhaustive priority scheduler for servicing a plurality of lower level schedulers in accordance with non-equal priority levels assigned thereto;
   a non-work conserving shaper scheduler feeding the exhaustive scheduler; and
   a work conserving idle bandwidth scheduler feeding the exhaustive scheduler;
   wherein the shaper scheduler has a higher priority level with respect to the exhaustive scheduler than the idle bandwidth scheduler, and wherein each queue is concurrently serviced by the shaper scheduler and the idle bandwidth scheduler.

20. The apparatus according to claim 19, wherein the shaper scheduler and the idle bandwidth scheduler service their respective queues by concluding which queue should be serviced and passing a queue identifier to the exhaustive scheduler.

21. The apparatus according to claim 20, wherein the exhaustive scheduler de-queues the messages from the queues.

22. The apparatus according to claim 21, wherein the idle bandwidth scheduler is a weighted fair queue (WFQ) scheduler.

23. The apparatus according to claim 22, including means for enqueuing incoming messages into appropriate queues.

24. The apparatus according to claim 23, including means for time stamping one of (i) the messages and (ii) the queues.

25. The apparatus according to claim 23, including means for time stamping the queues.

26. The apparatus according to claim 25, wherein, in the event an incoming message is placed at a head-of-line position in a queue i, the time stamp, TET, of queue i for the purposes of the shaper scheduler is $TET_i = \max\{TET_i, RTP\} + 1/R_i$, where RTP corresponds to a current time and $R_i$ is the minimum guaranteed service rate of queue i.

27. The apparatus according to claim 26, wherein, in the event a message is dequeued placing another message at a head-of-line position in a queue i, the time stamp, TET, of queue i for the purposes of the shaper scheduler is $TET_i = RTP + 1/R_i$.

28. The apparatus according to claim 26, wherein the shaper scheduler selects a queue, j, serviced thereby such that $j = \arg\{\min_i\{TET_i | TET_i - 1/R_i \leq RTP\}\}$.

29. The apparatus according to claim 27, wherein, in the event a packet assumes a head-of-line position in a queue i, it is issued a time stamp, TET, for the purposes of the WFQ idle bandwidth scheduler according to one of
(i) $TET_i = \max\{TET_i, VTP\} + 1/\phi_i$, and (ii) $TET_i = \max\{TET_i + 1/\phi_i, VTP\}$, where
VTP is the TET value of a queue that was last served, and $\phi_i$ is a WFQ weight.

30. The apparatus according claim 29, wherein the WFQ idle bandwidth scheduler selects a queue j, serviced thereby where $j = \arg\{\text{Min}_i\{TET_i\}\}$.

31. The apparatus according claim 30, wherein in the event a message is dequeued from a queue, $Q_J$, selected by the shaper scheduler, the TET for queue $Q_J$ for the WFQ scheduler is adjusted by $$TET_{Q_J} = TET_{Q_J} - \frac{1}{\phi_{Q_J}}.$$

32. The apparatus according claim 31, wherein in the event a message is dequeued from a queue, $Q_K$, selected by the WFQ scheduler, the TET for queue $Q_K$ for the shaper scheduler is adjusted by $$TET_{Q_K} = TET_{Q_K} - \frac{1}{R_{Q_K}}.$$

33. The apparatus according to claim 25, wherein the shaper scheduler comprises M shaper sub-schedulers and the idle bandwidth scheduler comprises N WFQ sub-schedulers, and wherein a set of queues are concurrently examined by one of the shaper sub-schedulers and one of the idle bandwidth sub-schedulers, and wherein the shaper sub-scheduler examining the set of queues has a higher priority level with respect to the exhaustive sub-scheduler than the idle bandwidth sub-scheduler examining the same set of queues.

34. The apparatus according to claim 33, wherein, in the event an incoming message is placed at a head-of-line position in a queue i, the time stamp, TET, of queue i for the purposes of the corresponding shaper sub-scheduler is $TET_i = \max\{TET_i, RTP\} + 1/R_i$, where RTP corresponds to a current time and $R_i$ is the minimum guaranteed service rate of queue i.

35. The apparatus according to claim 34, wherein, in the event a message is dequeued placing another message at a head-of-line position in a queue i, the time stamp, TET, of queue i for the purposes of the corresponding shaper sub-scheduler is $TET_i = RTP + 1/R_i$.

36. The apparatus according to claim 35, wherein a given shaper sub-scheduler selects a queue, j, serviced thereby such that $j = \arg\{\min_i\{TET_i | TET_i - 1/R_i \leq RTP\}\}$.

37. The apparatus according to claim 36, wherein, in the event a packet assumes a head-of-line position in a queue i, it is issued a time stamp, TET, for the purposes of the corresponding WFQ idle bandwidth sub-scheduler according to one of
(i) $TET_i = \max\{TET_i, VTP\} + 1/\phi_i$, and (ii) $TET_i = \max\{TET_i + 1/\phi_i, VTP\}$, where
VTP is the TET value of a queue that was last served by the corresponding WFQ sub-scheduler, and $\phi_i$ is a WFQ weight.

38. The apparatus according claim 37, wherein a given WFQ idle bandwidth sub-scheduler selects a queue, j, serviced thereby where $j = \arg\{\min_i\{TET_i\}\}$.

39. The apparatus according claim 38, wherein in the event a message is dequeued from a queue, $Q_J$, selected by one of the shaper sub-schedulers, the TET for queue $Q_J$ for the affiliated WFQ sub-scheduler is adjusted by $$TET_{Q_J} = TET_{Q_J} - \frac{1}{\phi_{Q_J}}.$$

40. The apparatus according claim 39, wherein in the event a message is dequeued from a queue, $Q_K$, selected by one of the WFQ sub-schedulers, the TET for queue $Q_K$ for the affiliated shaper sub-scheduler is adjusted by $$TET_{Q_K} = TET_{Q_K} - \frac{1}{R_{Q_K}}.$$

41. The apparatus according to claim 25, wherein the resource is a digital communications link the messages are data packets, and each queue is associated with a digital communications service class.

42. The apparatus according to claim 41, wherein the packets are of fixed size and the first and second means for servicing the queues operate synchronously to deliver one packet from the queues to the communications link during one fixed period time slot.

43. The apparatus according to claim 42, wherein the service classes are ATM traffic classes, and each queue is associated with one ATM traffic class.

44. The apparatus according to claim 43, wherein service classes are provisioned with a fixed portion of idle bandwidth, and the idle bandwidth proportion of a given queue within a given service class is proportional to its minimum guaranteed service rate relative to the guaranteed service rates of the other queues within the given service class.

45. The apparatus according to claim 43, wherein service classes are provisioned with a fixed portion of idle bandwidth, and the idle bandwidth proportion of a given queue within a given service class is equal to the fixed portion of idle bandwidth of the given service class divided by the total number queues associated with the given service class.

46. The apparatus according to claim 33, wherein M=2 and N=2, and wherein queues associated with CBR and rtVBR.1 ATM traffic classes are serviced by a first shaper sub-scheduler and a first WFQ idle bandwidth sub-scheduler, queues associated with rtVBR.2/3 ATM traffic classes are serviced by the first shaper sub-scheduler and a second WFQ idle bandwidth sub-scheduler, and queues associated with nrtVBR2/3, ABR, and UBR ATM traffic classes are serviced by a second shaper sub-scheduler and the second WFQ idle bandwidth sub-scheduler, and wherein the first shaper sub-scheduler has exhaustive priority over the second shaper sub-scheduler which has a exhaustive priority over the first WFQ idle bandwidth sub-scheduler which has a exhaustive priority over the second WFQ idle bandwidth sub-scheduler.

47. The apparatus according to claim 46, wherein each queue is associated with a virtual connection.

48. The apparatus according to claim 22, wherein said WFQ scheduler is a two level hierarchical scheduler comprising a plurality of low level WFQ sub-schedulers feeding a higher level WFQ sub-scheduler, the low level WFQ sub-schedulers for servicing the queues, and the higher level WFQ sub-scheduler for feeding the exhaustive scheduler.

49. The apparatus according to claim 48, wherein the resource is an ATM communications link, the finite processing bandwidth is a communications bandwidth, the messages are data packets, and each queue is associated with an ATM traffic class.

50. The apparatus according to claim 49, wherein each traffic class is allocated a portion of idle bandwidth, queues of a given class contend for service from one of said lower level WFQ sub-schedulers, and the weight of each lower level WFQ sub-scheduler with respect to the higher level WFQ sub-scheduler is equivalent to the idle bandwidth portion of the corresponding traffic class.

51. A hierarchical scheduler for servicing a plurality of queues holding messages, the scheduler comprising:

an exhaustive sub-scheduler servicing a plurality of lower level sub-schedulers in accordance with non-equal priority levels assigned thereto;

at least one non-work conserving shaper sub-scheduler feeding the exhaustive sub-scheduler; and at least one work conserving idle bandwidth sub-scheduler feeding the exhaustive sub-scheduler;

wherein a given queue is concurrently serviced by one shaper sub-scheduler of the at least one shaper sub-scheduler and one idle bandwidth sub-scheduler of the at least one idle bandwidth sub-scheduler, and wherein the one shaper sub-scheduler servicing the given queue has a higher priority level with respect to the exhaustive sub-scheduler than the one idle bandwidth sub-scheduler servicing the given queue.

52. The scheduler according to claim 51, wherein the at least one shaper sub-scheduler and the at least one idle bandwidth sub-scheduler service the queues by selecting a queue to service and providing the exhaustive sub-scheduler with a queue identifier.

53. The scheduler according to claim 52, wherein the exhaustive sub-scheduler removes messages from the queues.

54. The scheduler according to claim 53, wherein each idle bandwidth sub-scheduler of said at least one idle bandwidth sub-scheduler is a weighted fair queue (WFQ) scheduler.

55. The scheduler according to claim 54, wherein each queue is provisioned with a fixed weight in respect of the at least one idle bandwidth sub-scheduler.

56. The scheduler according to claim 54, wherein each queue is provisioned with a weight in respect of the at least one idle bandwidth sub-scheduler which corresponds to the length of the queue.

57. The scheduler according to claim 54, wherein the resource is a digital communications link having a communications bandwidth, the messages are data packets, and each queue is associated with a digital communications service class.

58. The scheduler according to claim 57, wherein the packets are of fixed size and the sub-schedulers servicing the queues operate synchronously to deliver one packet from the queues to the communications link during one fixed period time slot.

59. The scheduler according to claim 58, wherein the service classes are ATM traffic classes, and each queue is associated with an ATM traffic class.

60. The scheduler according to claim 59, wherein service classes are provisioned with a fixed ratio idle bandwidth proportion, and the idle bandwidth proportion of a given queue within a given service class is proportional to its minimum guaranteed service rate relative to the guaranteed service rates of the other queues within the given service class.

61. The scheduler according to claim 59, wherein service classes are provisioned with a fixed ratio idle bandwidth proportion, and the idle bandwidth proportion of a given queue within a given service class is equal to the fixed ratio idle bandwidth proportion of the given service class divided by the total number queues associated with the given service class.

62. The scheduler according to claim 61, wherein said at least one shaper sub-scheduler is two shaper sub-schedulers and said at least one idle bandwidth sub-scheduler is two idle bandwidth sub-schedulers, and wherein queues associated with CBR and rtVBR.1 ATM traffic classes are serviced by a first shaper scheduler of said two shaper sub-schedulers and a first idle bandwidth scheduler of said two idle bandwidth sub-schedulers, queues associated with rtVBR.2/3 ATM traffic classes are serviced by the first shaper scheduler and a second idle bandwidth scheduler of said two idle bandwidth sub-schedulers, and queues associated with nrtVBR2/3, ABR and UBR ATM traffic classes are serviced by a second shaper scheduler of said two shaper sub-schedulers and the second idle bandwidth scheduler, and wherein the first shaper scheduler has a higher priority than the second shaper scheduler which has a higher priority than the first idle bandwidth scheduler which has a higher priority than the second idle bandwidth scheduler.

63. The scheduler according to claim 62, wherein each queue is associated with a virtual connection.

64. The scheduler according to claim 51, wherein the number of shaper sub-schedulers is equal to the number of idle bandwidth sub-schedulers, and any shaper sub-scheduler has exhaustive priority over all of the at least one idle bandwidth sub-scheduler.

65. The scheduler according to claim 51, wherein the at least one shaper sub-scheduler is one shaper sub-scheduler and the at least one idle bandwidth sub-scheduler is one idle bandwidth sub-scheduler.

66. A method for servicing a plurality of queues by a scheduling apparatus, said plurality of queues holding messages destined for processing by a resource having a finite processing bandwidth, each queue of said plurality of queues provisioned with a minimum guaranteed service rate and an idle bandwidth proportion, said scheduling apparatus having a work conserving scheduler and a non-work conserving scheduler, said method comprising the steps of:

(a) selecting a queue of said plurality of queues for service by said work conserving scheduler;

(b) selecting at most one queue of said plurality of queues for service by said non-work conserving scheduler;

(c) identifying a first queue identifier of said queue selected for service by said work conserving scheduler;

(d) when said non-work conserving scheduler selects one queue of said plurality of queues in said step (b), identifying a second queue identifier of said one queue selected for service by said non-work conserving scheduler; and (e) selecting one of said first queue identifier and said second queue identifier, if any, to identify a queue of said plurality of queues for service.

67. A method for servicing a plurality of queues by a scheduling apparatus as claimed in claim 66, further comprising:

(f) forwarding a message to said resource from said queue identified for service in said step (e).

68. A method for servicing a plurality of queues by a scheduling apparatus as claimed in claim 67, wherein said steps (a) and (b) are performed concurrently and said steps (c) and (d) are performed concurrently.

69. A method for servicing a plurality of queues by a scheduling apparatus as claimed in claim 68, wherein, when said non-work conserving scheduler selects said one queue in said step (b), step (e) comprises selecting said second queue identifier.

70. A method for servicing a plurality of queues by a scheduling apparatus as claimed in claim 69, wherein, for said step (b), said at most one queue is selected to enable said each queue of said plurality of queues to have approximately its said minimum guaranteed service rate.

71. A method for servicing a plurality of queues by a scheduling apparatus as claimed in claim 70, wherein said queue is selected in said step (a) to enable said each queue of said plurality of queues to be serviced, when said non-work conserving scheduler is idle, according to its said idle bandwidth proportion.

* * * * *